April 20, 1965  H. L. WILLIAMS  3,178,950
TRUNNION SEAL FOR SCREW-TYPE OPERATOR
Filed May 23, 1962
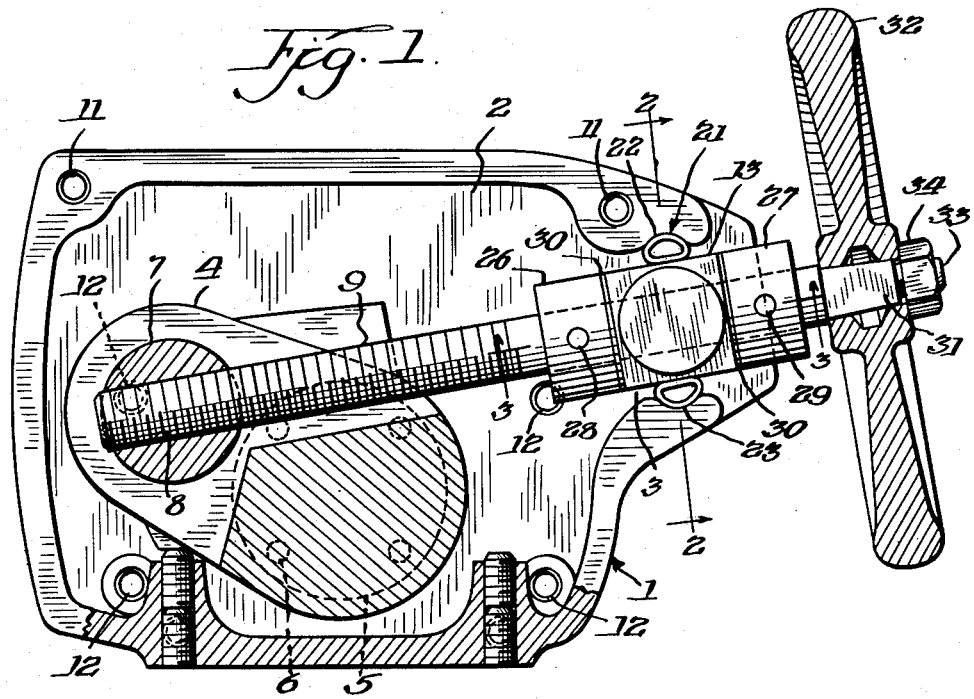
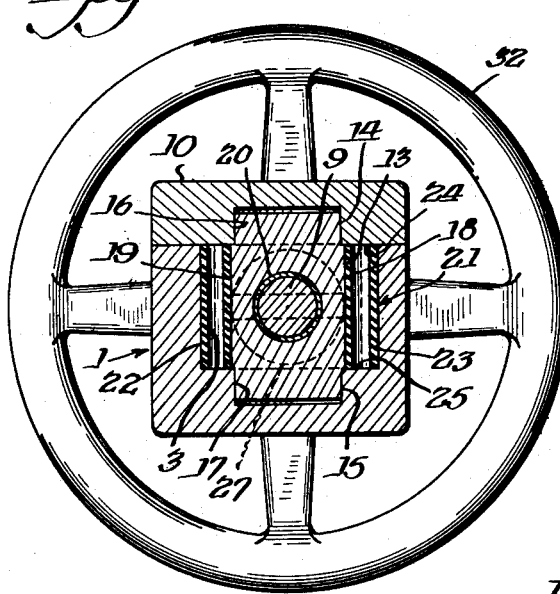
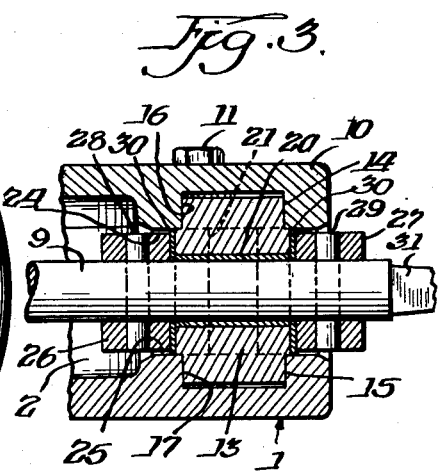
Inventor.
Hubert L. Williams.
By Joseph O. Lange
Atty.

United States Patent Office 3,178,950
Patented Apr. 20, 1965

3,178,950
TRUNNION SEAL FOR SCREW-TYPE
OPERATOR
Hubert L. Williams, Chicago, Ill., assignor to Crane Co.,
Chicago, Ill., a corporation of Illinois
Filed May 23, 1962, Ser. No. 196,954
8 Claims. (Cl. 74—89)

This invention relates generally to a valve operator, and, more particularly, it is concerned in connection therewith with a trunnion seal for a screw-type valve operator in which the valve to be actuated rotates through a quarter turn of ninety degrees in opening and closing the valve.

In order to acquire a better appreciation of the merits of this contribution, it should be understood that in such installations where there is a relative pivotal movement of the actuating screw shaft involved, such as of the order of approximately fifteen degrees, it is desirable that the trunnion in which said actuating shaft is mounted be suitably rendered relatively dustproof. Where the motion of the trunnion is even of the relatively small amount referred to, nevertheless, it is desirable that at all stages of such movement an effective dust seal be provided.

Therefore, it is one of the more important objects of this invention to provide a relatively dustproof trunnion seal having effectiveness even with the extent of shaft pivotal movement referred to.

Another object is to provide for a relatively economical seal having an unusual high degree of durability.

Another important object is to provide for a dust seal construction which is not only easily installed initially, but is capable of being serviced readily in the field when such servicing becomes necessary.

Another object is to provide for a trunnion seal in which the housing receiving said seal requires relatively minor machining or special treatment in order to accommodate the seal.

A further object is to provide for a seal in which readily available materials, such as commercial flexibile tubing, may be employed for the purpose of effecting the seal. For example, one of the available synthetic tubing compositions available is identified by the trademark "neoprene" of the E. I. du Pont de Nemours & Co. of Wilmington, Delaware. Any other suitable materials including rubber may be selectively used, depending upon the nature of the service encountered in the field.

Other objects and advantages will become more readily apparent upon proceeding with the following description read in light of the accompanying drawings, in which:

FIG. 1 is a sectional assembly view in plan of a preferred embodiment of a valve operator illustrating my invention;

FIG. 2 is a transverse sectional assembly view taken on the line 2—2 of FIG. 1; and FIG. 3 is a sectional assembly view taken at right angles to that referred to in FIG. 2 and is taken on the line 3—3 of FIG. 1.

Similar reference numerals refer to similar parts throughout the several views.

Referring now to FIG. 1, a valve operator housing generally designated 1 is shown with cover removed, having therewithin the inner chamber 2 and a side disposed opening therefrom designated 3. The housing chamber 2 on its lower surface portion is provided with the lever 4, the said lever being journalled within the lower surface portion defining the chamber 2 as at rotatable hub 5. The said hub as indicated at 6 is provided with a plurality of projecting coupling pins 6 for the purpose of providing the usual attachment to the rotatable stem or shaft (not shown) of the valve or the like to be actuated.

The lever 4 in effecting said rotation of the valve stem or shaft moves through an arc of approximately 90° from the position shown in either opening or closing the valve, depending upon the position of the valve. The lever 4 on an upper surface portion is provided with a threaded nut 7, the latter member being transversely threaded as at 8 to receive the threaded screw 9. The threaded nut 7 is revolvable with the pivotal movement of the lever 4 in the course of the said actuating movement as previously referred to.

A plurality of cap screw tappings indicated at 11 provide the necessary attachment means for cover 10 to the housing 1, the cover being shown in FIG. 3. The tappings at 12 provide for the usual attachment of the housing to a valve adapter (not shown).

The end portion of the threaded shaft 9 is provided with a trunnion block 13 which, as shown more clearly in FIG. 2, is of polygonal or square configuration, having at its upper limits the trunnion bearing 14 swivelable in the recess 16 of the cover 10. At its lower portion, the trunnion bearing 15 engages the recessed portion 17 of the housing 1, as more clearly shown in FIGS. 2 and 3.

On each of two of the sides of the trunnion block 13 as indicated at 18 and 19 respectively, the trunnion dust seal structure generally designated 21 is applied. The seal structure consists of a pair of identical oppositely disposed short lengths of tubing 22 and 23, respectively, the length of each of which is preferably made very slightly longer than the opening defined by the respective upper and lower surfaces 24 and 25 in order that the said lengths of tubing 22 and 23 may be suitably provided with a predetermined amount of end applied compression. In order to hold the trunnion block 13 in desired position with respect to inhibiting axial movement inner and outer thrust collars 26 and 27 being pinned to shaft by the transverse pins 28 and 29 respectively being pinned to the threaded shaft 9 as illustrated. As indicated, a suitable cylindrical bearing 20 is provided between the shaft 9 and the trunnion block 13. Said bearing is preferably supplemented by oppositely disposed thrust bearings 30 between said trunnion block 13 and the respective inner and outer thrust collars 26 and 27. In this connection, it should be appreciated that the bearings may be of materials to suit the installation and preferably having a low coefficient of friction. The outer end portion of the threaded shaft 9 extending beyond the thrust collar 27 is provided with a conventional polygonally formed end limit as indicated at 31 for receiving a handwheel 32, the latter member being held to the stem by means of the threaded shank 33 and the wheelnut 34, all as more clearly shown in FIG. 1. It will be understood that the seal comprising the tubular members indicated at 22 and 23 flexes with the movement of the trunnion block during the course of the arcuate movement of the lever 4 on the threads of the shaft 9 in the normal course of opening and closing the valve. It will be appreciated that such pivotal movement of the lever occurs upon rotation of the handwheel 32. It will further be understood of course that while manual operation is indicated by means of the handwheel 32, other suitable means for rotating the shaft 9 may be used, as, for example, an electric valve operator or a suitable hydraulic mechanism. A gear rack may also be employed in connection with the hydraulic operator.

In summary, it will now be understood that a simple, durable, and efficient dust seal has been provided for a pivotally mounted trunnion having the benefit of greater economy from the standpoint of original cost and installation as well as with regard to subsequent maintenance.

While only a single embodiment has been illustrated and described, this is only for purpose of exemplifying the

I claim:

1. In an operator for a rotary valve having a rotatable closure member and a rotatable valve stem therefor comprising:
   an operator housing around the rotatable valve stem;
   the said housing having an end disposed opening;
   the valve stem projecting transversely into the said housing;
   a lever on said valve stem pivotally movable in said housing and having a rotatable threaded nut thereon;
   a threaded shaft rotatably engaging said nut;
   the said shaft being threaded for a substantial portion of its length to permit 90 degrees arcuate movement of the said lever;
   the said threaded shaft projecting through said end disposed opening in the housing;
   a trunnion block with upper and lower trunnion bearings in said housing opening mounted around a longitudinal unthreaded portion of said shaft;
   the said trunnion block having means for sealing said trunnion block in said housing opening comprising a plurality of linear dust seals interposed in snug relation between walls defining said housing opening and outer portions of said trunnion block.

2. The subject matter of claim 1, the said housing opening receiving said trunnion seals being polygonal in transverse section;
   the said seals being oppositely disposed and substantially coinciding with at least certain of the side walls forming the said housing polygonal opening.

3. The subject matter of claim 2, the said sealing means for the trunnion block comprising predetermined substantially straight lengths of flexible material.

4. The subject matter of claim 3, the said straight lengths of flexible material being fitted in said opening and being of a length sufficient to provide predetermined end compression between said flexible material and spaced apart wall portions of said housing opening.

5. The subject matter of claim 4, the said straight lengths of flexible material being of tubular configuration in cross-section and of a rubber-like material.

6. The subject matter of claim 5, the said flexible material being substantially ellipsoidal in cross-section upon assembly and having its inner peripheral portion flattened to bear against opposite sides of said trunnion block, the latter member having flat surfaces to receive the said flattened portions of the said dust seals.

7. The subject matter of claim 1, the said trunnion block and said opening of the housing when viewed in transverse section being defined by at least four walls, two of which are oppositely disposed and are contacted by said dust seals, the said trunnion block having oppositely disposed side surfaces in predetermined spaced apart relation to said side disposed walls contacted by said dust seals, the latter seals substantially filling said spaces between the trunnion block and said housing opening.

8. The subject matter of claim 7, the said trunnion block being journalled in the housing in a plane extending between said dust seals.

References Cited by the Examiner

UNITED STATES PATENTS

| | | | |
|---|---|---|---|
| 2,457,908 | 1/49 | Meyerhoefer | 277—169 |
| 2,638,307 | 5/53 | Fortune | 251—335 |
| 2,654,561 | 10/53 | Trefil | 251—335 |
| 2,832,614 | 4/58 | Settle | 277—169 X |
| 2,908,182 | 10/59 | Bacchi | 74—89 X |
| 3,011,359 | 12/61 | Morrell | 74—509 |
| 3,043,160 | 7/62 | Killian | 74—509 |

FOREIGN PATENTS 878,164  1/43  France.

BROUGHTON G. DURHAM, *Primary Examiner.*